No. 856,887. PATENTED JUNE 11, 1907.
L. KUYKENDALL.
TRUCK.
APPLICATION FILED JAN. 10, 1907.
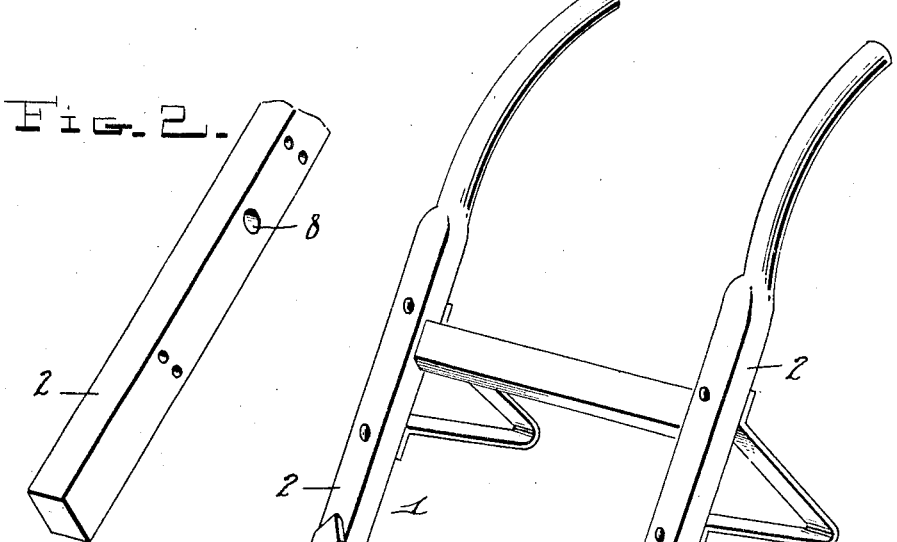
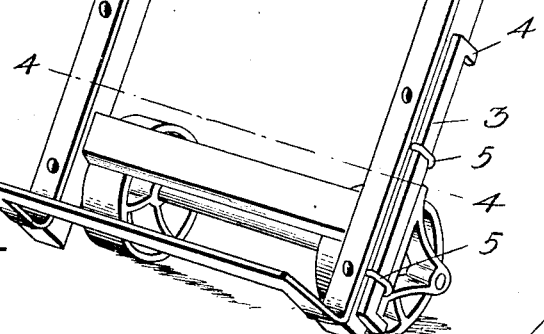
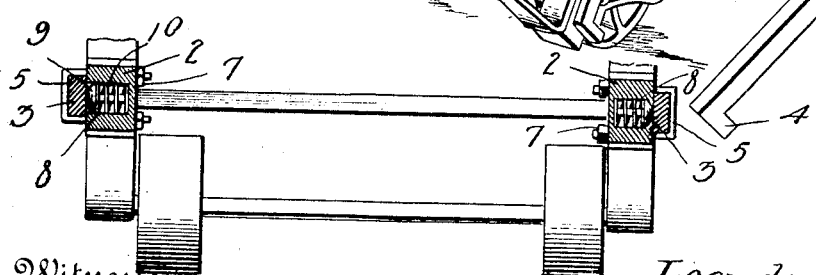
Witnesses
Inventor
Leander Kuykendall
by H. B. Willson & Co
Attorneys

UNITED STATES PATENT OFFICE.

LEANDER KUYKENDALL, OF RIVERSIDE, CALIFORNIA.

TRUCK.

No. 856,887.  Specification of Letters Patent.  Patented June 11, 1907.

Application filed January 10, 1907. Serial No. 351,673.

*To all whom it may concern:*

Be it known that I, LEANDER KUYKENDALL, a citizen of the United States, residing at Riverside, in the county of Riverside and State of California, have invented certain new and useful Improvements in Trucks; and I do declare the following to be a full, clear, and exact description of the invention, such as will enable others skilled in the art to which it appertains to make and use the same.

My invention has relation to new and useful improvements in trucks, such as are commonly used in stores, hotels, warehouses or other like places and has for its object to provide means whereby a truck may be easily and readily converted into a carrier to carry trunks, boxes, or other like articles where it is impossible to wheel or truck them, as in carrying trunks or the like up or down stairs, or boxes across rough or uneven surfaces.

With these and other ends in view that will readily appear as the nature of the invention is better understood, my invention consists in the novel construction, combination and arrangement of parts, as illustrated in the drawings and set forth in the specification and claims hereunto appended.

Figure 1 is a perspective view of a truck provided with my improvements; Fig. 2 is a detail perspective view of a section of one of the side bars of the truck frame; Fig. 3 is a perspective view of one of the auxiliary bars, and Fig. 4, a transverse sectional view on the line 4—4 of Fig. 1, with the auxiliary bar in position.

The numeral 1 represents the truck frame, having the usual side bars 2; the numeral 3 represents two elongated auxiliary bars, each of which is provided on its under edge near or at each end with a vertical integral extension 4, the purpose of which will be disclosed. Said auxiliary bars are adjustably and removably secured in position to the side bars 2 of said truck frame 1 by suitable clips 5 which pass through corresponding transverse perforations in said side bars and provided with nuts 7 to hold them in position. A suitable hole 8 is bored or otherwise formed in the outer face of each of the side bars of said truck frame, and a member 9 provided with a head on its outer end and, having a coil spring 10 working around its body is loosely arranged in each of said holes. Said springs act with sufficient force to keep the heads of said members 9 in engagement with the inner faces of said auxiliary bars and hold them against displacement.

When it is desirable to use the truck as a carrier to carry trunks, boxes, or other heavy articles where the use of a truck is impossible, said auxiliary bars 3 are drawn out until the integral vertical extensions at their inner ends engage the adjacent clips 5, in which case the opposite ends of said auxiliary bars extend some little distance beyond the lower or nose ends of the side bars of the truck frame and provide a substantial means for lifting the lower end of said truck. When it is desirable to again use the truck for truck purposes instead of as a carrier, said auxiliary bars are pushed back into their normal positions, and the heads of the members 9 by reason of said coil springs 10, bear with sufficient force against the inner faces of said auxiliary bars to hold them against displacement.

Having described my invention, what I claim as new and desire to secure by Letters Patent is,—

1. The combination in a truck having holes in the outer faces and near the lower ends of the side bars of its frame, of two elongated auxiliary bars, having vertical integral extensions on their under edges near their ends; clips adapted to removably secure the inner faces of said auxiliary bars against the outer faces of the side bars of the truck frame; rivets working in said holes in the side bars of said truck frame, with means for holding the heads of said rivets in engagement with said auxiliary bars, substantially as described.

2. In a truck and in combination with the side rail thereof, bearing clips attached to said rails, auxiliary extension bars arranged for longitudinal movement in said bearing clips, the side rails being provided with outwardly opening sockets situated at points between the ends of the auxiliary bars, locking members arranged for movement in the sockets and to bear on the inner faces of the bars for fixing them against movement, and springs disposed in the sockets to act upon the locking members and press them to locking position.

3. In a truck and in combination with its side rails, bearings attached thereto, elongated extension bars arranged for longitudinal movement in said bearings, the side rails being provided with sockets disposed at points between the ends of the extension bars, locking members loosely arranged in said sockets and provided at their outer ends with heads to bear on the inner faces of the extension bars for holding them against movement, and springs arranged in the sockets for pressing the locking members to locking position.

In testimony whereof I have hereunto set my hand in presence of two subscribing witnesses.

LEANDER KUYKENDALL.

Witnesses:
SAMUEL G. PETERS,
W. S. EASTON.